(12) United States Patent
Aoki

(10) Patent No.: US 9,361,944 B1
(45) Date of Patent: Jun. 7, 2016

(54) MAGNETIC DISK DRIVE AND REWRITE PROCESSING METHOD

(71) Applicant: Kabushiki Kaisha Toshiba, Minato-ku, Tokyo (JP)

(72) Inventor: Shoichi Aoki, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/739,462

(22) Filed: Jun. 15, 2015

(30) Foreign Application Priority Data

Feb. 25, 2015 (JP) ................................. 2015-034910

(51) Int. Cl.
*G11B 27/36* (2006.01)
*G11B 5/012* (2006.01)
*G11B 19/04* (2006.01)
*G11B 20/18* (2006.01)
*G11B 5/02* (2006.01)
*G11B 5/09* (2006.01)

(52) U.S. Cl.
CPC ................ *G11B 27/36* (2013.01); *G11B 5/012* (2013.01); *G11B 19/04* (2013.01); *G11B 20/1816* (2013.01); *G11B 5/02* (2013.01); *G11B 5/09* (2013.01)

(58) Field of Classification Search
CPC ...... G11B 19/04; G11B 27/329; G11B 27/36; G11B 20/1816; G11B 5/012; G11B 5/02; G11B 5/09; G11B 20/10009; G11B 19/041; G11B 2220/2516; G11B 2020/10898; G11B 2220/20; G11B 2220/90; G11B 5/5526; G11B 5/59627
USPC ....................................................... 360/31, 39
See application file for complete search history.

(56) References Cited

U.S. PATENT DOCUMENTS

| | | |
|---|---|---|
| 6,429,984 B1 | 8/2002 | Alex |
| 7,945,727 B2 | 5/2011 | Rothberg et al. |
| 8,120,868 B2 * | 2/2012 | Bi ........................ G11B 5/59655 360/48 |
| 8,531,791 B1 | 9/2013 | Reid et al. |
| 9,240,198 B1 * | 1/2016 | Hara ....................... G11B 5/012 |

* cited by examiner

*Primary Examiner* — Ali Neyzari
(74) *Attorney, Agent, or Firm* — White & Case LLP

(57) ABSTRACT

According to one embodiment, a magnetic disk drive including a disk including a plurality of track groups each including a first write track and a second write track partially overlapping the first write track, and a processor configured to count a write count corresponding to write processing of adjacent track groups for each of the plurality of track groups, and calculate an estimated time at which the write count reaches a particular value and, if a track group in which the estimated time is approximate is detected, read data of the approximate track group, and execute rewrite processing of writing the data to the track group in which the estimated time is approximate, at a time earlier than the estimated time.

16 Claims, 7 Drawing Sheets

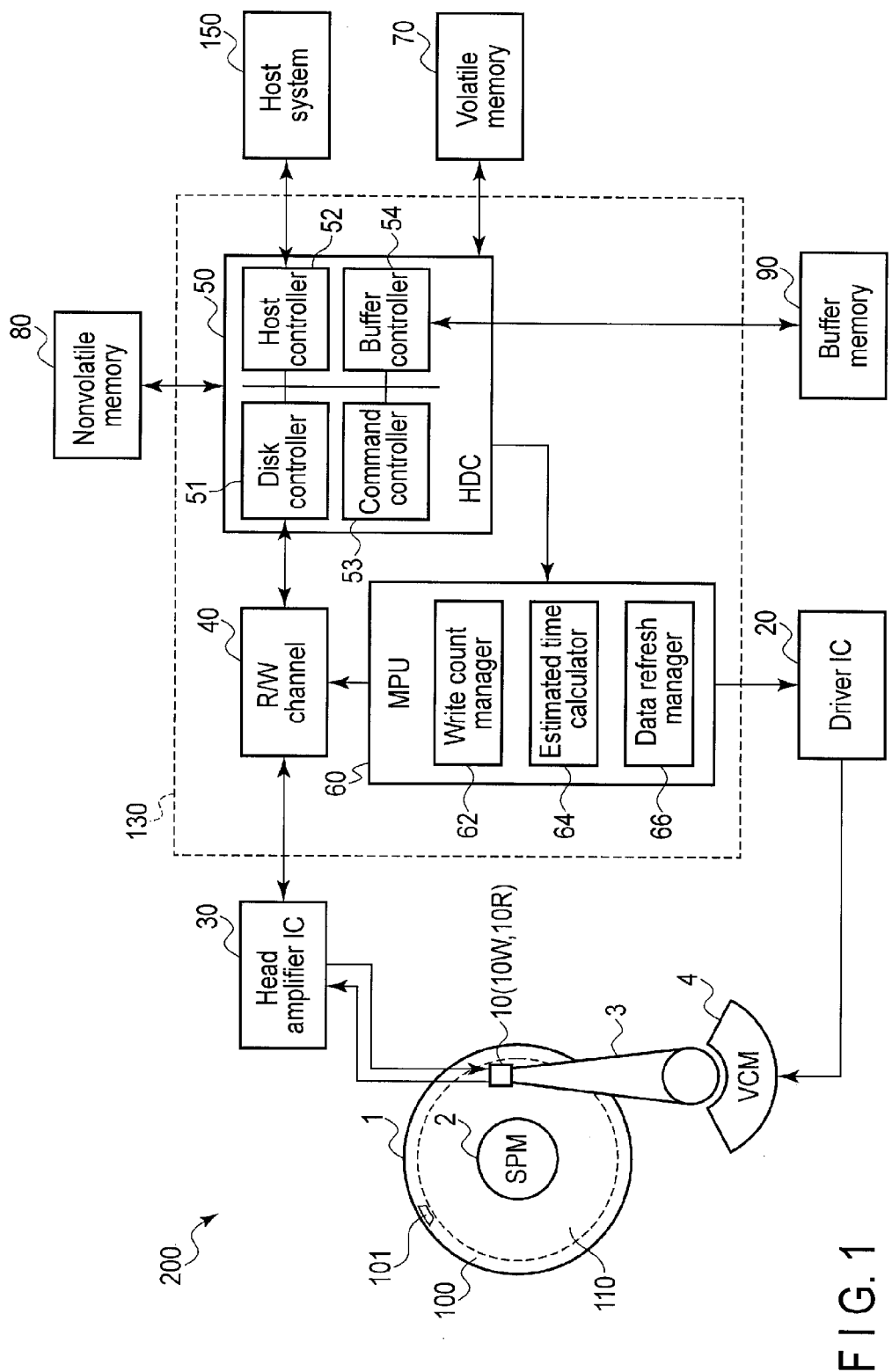
F I G. 1

| Band | Threshold value | Write count | | Write time | | Estimated time |
|---|---|---|---|---|---|---|
| Cache region | K | k' | k | t' | t | T |
| 0 | 100 | 20 | 21 | 6100 | 6200 | 14100 |
| 1 | 100 | 89 | 90 | 6100 | 6201 | 7211 |
| 2 | 100 | 90 | 91 | 6110 | 6220 | 7210 |
| 3 | 100 | 93 | 94 | 6200 | 6344 | 7208 |
| 4 | 100 | 60 | 61 | 6220 | 6320 | 10220 |
| | 100 | 55 | 56 | 6400 | 6418 | 7210 |
| ... | | | | | | |

G1 ─ 101

Data refresh initial start time=Td0
Data refresh start time=Td
Data refresh time=m
Current time=Tn
...

F I G. 3

| Band | | Threshold value | Write count | | Write time | | Estimated time |
|---|---|---|---|---|---|---|---|
| | Cache region | K | k' | k | t' | t | T |
| 0 | outer | 100 | 20 | 21 | 6100 | 6200 | 14100 |
| | inner | 100 | 10 | 11 | 1000 | 5000 | 361000 |
| 1 | outer | 100 | 89 | 90 | 6100 | 6201 | 7211 |
| | inner | 100 | 97 | 98 | 6020 | 6040 | 6080 |
| 2 | outer | 100 | 90 | 91 | 6110 | 6220 | 7210 |
| | inner | 100 | 60 | 61 | 6220 | 6320 | 10220 |
| 3 | outer | 100 | 93 | 94 | 6200 | 6344 | 7208 |
| | inner | 100 | 69 | 70 | 6302 | 6503 | 12533 |
| 4 | outer | 100 | 55 | 56 | 6400 | 6418 | 7210 |
| | inner | 200 | 90 | 91 | 6501 | 6509 | 7381 |
| ... | outer | 200 | 98 | 99 | 6430 | 6507 | 14284 |
| | inner | ... | ... | ... | ... | ... | ... |

G2

101

Data refresh initial start time=Td0
Data refresh start time=Td
Data refresh time=m
Current time=Tn
...

F I G. 7

MAGNETIC DISK DRIVE AND REWRITE PROCESSING METHOD

CROSS-REFERENCE TO RELATED APPLICATIONS

This application is based upon and claims the benefit of priority from Japanese Patent Application No. 2015-034910, filed Feb. 25, 2015, the entire contents of which are incorporated herein by reference.

FIELD

Embodiments described herein relate generally to a magnetic disk drive and a rewrite processing method.

BACKGROUND

Recently, various types of technology for implementing increase in the recording capacity of a magnetic disk drive (hereinafter also called HDD) which is an example of recording devices have been developed. One type of recording technology is called shingled write recording (SMR). The shingled write recording writes data to a magnetic disk by overlapping the recording track on a part of a track adjacent to the recording track. The tracks per inch (TPI) can be increased by adopting the shingled write recording.

In addition, a host aware/managed-type magnetic disk drive issues a write request signal so as to allow a magnetic disk drive to efficiently write data to a magnetic disk with shingled write recording operations has been proposed. When data is written in a track group (called a band) which is a recording unit of the shingled write recording and which includes a plurality of tracks, data held in an adjacent band is influenced by magnetic interference called adjacent track interference (ATI). For this reason, when data is repeatedly written to a particular band on the magnetic disk, the data in the adjacent band is repeatedly affected by the magnetic interference and may become unreadable (lost). In the host aware/managed-type magnetic disk drive, data may be repeatedly written in a particular band.

To prevent the data from being unreadable (data loss), the magnetic disk drive has a (data refresh) function of voluntarily rewriting the data in the band. In the host aware/managed-type magnetic disk drive, data refresh may occur in a plurality of bands at once. Therefore, a performance of response in the magnetic disk drive to the request from the host may be deteriorated.

BRIEF DESCRIPTION OF THE DRAWINGS

FIG. 1 is a block diagram showing a magnetic disk drive of a first embodiment.

FIG. 3 is a table showing an example of system information of the first embodiment.

FIG. 7 is a table showing an example of system information of a modified example of the first embodiment.

DETAILED DESCRIPTION

Figure 2:
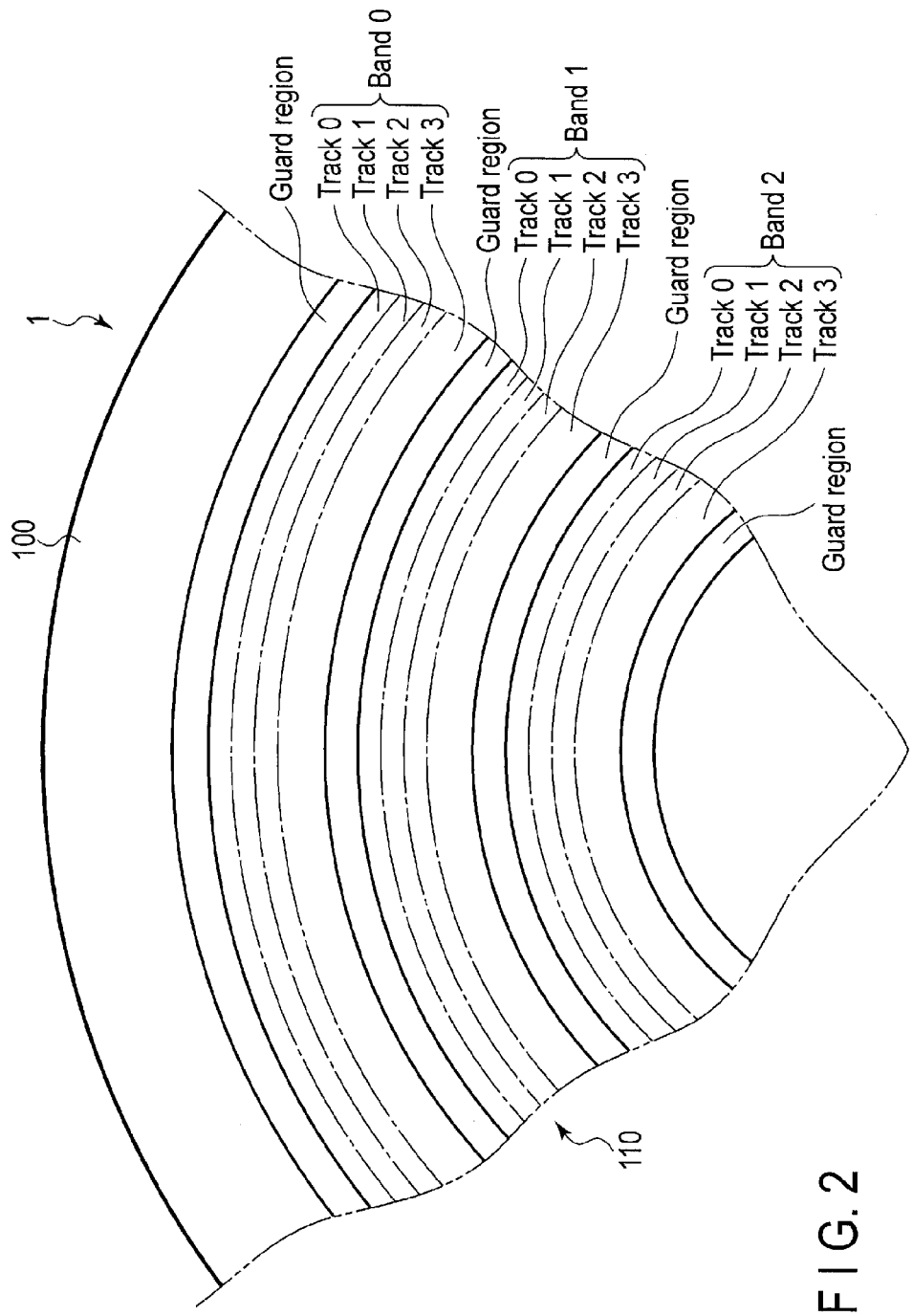
FIG. 2 is an illustration for explanation of shingled write recording adopted in the magnetic disk drive of the first embodiment.

In general, according to one embodiment, a magnetic disk drive comprising: a disk comprising a plurality of track groups each comprising a first write track and a second write track partially overlapping the first write track; and a processor configured to count a write count corresponding to write processing of adjacent track groups for each of the plurality of track groups, and calculate an estimated time at which the write count reaches a particular value and, if a track group in which the calculated estimated time is approximate is detected, read data of the track group in which the estimated time is approximate, and execute rewrite processing of writing the read data to the track group in which the estimated time is approximate, at a time earlier than the estimated time.

Embodiments will be described hereinafter with reference to the accompanying drawings.

First Embodiment

FIG. 1 is a block diagram showing magnetic disk drive 200 of the present embodiment.

The magnetic disk drive 200 of the present embodiment is a host aware/managed-type HDD in which data is written in shingled write recording (also called SMR). In the magnetic disk drive of the shingled write recording, a plurality of track groups (band) are formed on the magnetic disk (disk). The band includes a plurality of tracks (or write tracks). In the band, each of a plurality of tracks is written to partially overlap the other track, but the last written track is not overwritten. The magnetic disk drive of the shingled write recording sequentially writes the data to the disk, for each band, by using the band as a recording unit.

The magnetic disk drive 200 includes a head-disk assembly (HDA) which will be explained later, a driver IC 20, a head amplifier integrated circuit (hereinafter called a head amplifier IC) 30, a volatile memory 70, a nonvolatile memory 80, a buffer memory 90, and a system controller 130 composed of a single-chip integrated circuit.

In addition, the magnetic disk drive 200 is connected with a host system (host) 150. The host system 150 connected with the host aware/managed-type magnetic disk drive 200 stores information concerning data configuration of the magnetic disk drive 200, for example, information of a single band size. The host system 150 can output a write command so as to enable the magnetic disk drive 200 to easily execute writing in each band, by managing a leading logical block address (LBA) of each band.

A structure of the magnetic disk drive 200 of the embodiments will be hereinafter explained.

The HDA includes a magnetic disk (hereinafter called a disk) 1, a spindle motor (SPM) 2, an arm 3 equipped with a head 10, and a voice coil motor (VCM) 4. The disk 1 is rotated by the spindle motor 2. The arm 3 and the VCM 4 constitute an actuator. The actuator is driven by the VCM 4 to control movement of the head 10 mounted on the arm 3 to a specified position on the disk 1. At least one disk 1 and at least one head 10 are provided.

Each disk 1 includes a media cache region 100 and a shingled write recording region (SMR region) 110 as data storage regions. The media cache region 100 is cache of the shingled write recording region 110.

The media cache region 100 is, for example, a storage region held on an outermost peripheral side of the disk 1, and data storage region of a low track density (tracks per inch [TPI]) in which the data is written by a general write operation which is not the shingled write recording. The media cache region 100 stores system information 101. The system information 101 includes information such as a position of the storage region where writing/reading is executed, number of times of writing/reading, a start time of data refresh (rewrite processing), etc., in relation to the shingled write recording region 110. The data refresh is the rewrite processing of temporarily reading the data written in a particular recording region and writing the data in the same storage region. In the embodiments, the data refresh indicates an operation of temporarily reading the data written in a particular region and writing the data in the same region. Details of the system information 101 will be explained later. The system information 101 may be written in a memory or a storage medium other than the media cache region 100.

The shingled write recording region 110 is a recording region of a high track density where the data is written to overlap an adjacent track in part. The shingled write recording region 110 includes a plurality of bands each including at least one first track where the data is overwritten in part in the adjacent track and a second track where the data is last overwritten. The track width of the second track is broader than that of the first track. User data, etc., are written in the shingled write recording region 110.

The head 10 is provided on a slider which is a main body, and includes a write head 10W and a read head 10R mounted on the slider. The read head 10R reads data written in the tracks on the disk 1. The write head 10W writes the data to the disk 1.

The driver IC 20 controls driving the SPM 2 and the VCM 4.

The head amplifier IC 30 includes a read amplifier and a write driver. The read amplifier amplifies a read signal which is read by the read head 10R, and transmits the read signal to a read/write (R/W) channel 40. In contrast, the write driver transmits a write current corresponding to the write data output from the R/W channel 40 to the write head 10W.

The volatile memory 70 is a semiconductor memory where the stored data is lost when power supply is cut off. The volatile memory 70 stores data necessary for processing in each portion of the magnetic disk drive 200, etc. The volatile memory 70 is, for example, a random access memory (RAM), etc.

The nonvolatile memory 80 is a semiconductor memory where the stored data is held even if power supply is cut off. The nonvolatile memory 80 is, for example, a flash read-only memory (flash ROM), a magnetoresistive random access memory (MRAM), etc.

The buffer memory 90 is a semiconductor memory where transmitted and received data elements are temporarily stored. The buffer memory 90 stores the data transmitted and received between the disk 1 and the host system 150, etc. The buffer memory 90 may be constituted integrally with the volatile memory 70.

The system controller 130 includes the R/W channel 40, a hard disk controller (HDC) 50, and a microprocessor (MPU [processor]) 60.

The R/W channel 40 executes signal processing of the read data and the write data.

The HDC 50 controls data transfer between the host system 150 and the R/W channel 40. The HDC 50 includes a disk controller 51, a host controller 52, a command controller 53, and a buffer controller 54. The controllers are connected to each other via buses, in the HDC 50.

The disk controller 51 is connected with the R/W channel 40 to control the disk 1.

The host controller 52 controls data transfer between the host system 150 and the R/W channel 40.

The command controller 53 controls the write command or the read command received from the host system 150.

The buffer controller 54 is connected with the buffer memory 90 to control transmission of the data to the buffer memory 90 or reception of the data from the buffer memory 90. The buffer controller 54 temporarily stores, for example, data read from the disk 1, data to be written to the disk 1, etc.

The MPU 60 is a main controller which controls the portions of the magnetic disk drive 200. The MPU 60 controls the VCM 4 via the driver IC 20 and executes servo control for positioning the head 10. Furthermore, the MPU 60 controls the operation of writing the data to the disk 1 and executes control of selecting a storage destination of the write data transferred from the host system 150. The writing operation controlled by the MPU 60 includes a shingled write recording operation.

FIG. 2 is an illustration for explanation of the shingled write recording operation employed in the magnetic disk drive 200 of the present embodiment. The disk 1 is enlarged in part in FIG. 2. In FIG. 2, for example, each band is formed of four tracks (track 0, track 1, track 2, and track 3). The number of tracks included in the band is not limited to four.

In the magnetic disk drive 200, the tracks (data tracks) are formed radially on the disk 1 by writing the data to the disk 1 with the write head 10W. Each track is sequentially overwritten in the shingled write recording region 110, in the shingled write recording. In FIG. 2, the write head 10W writes the data in order of track numbers 0, 1, 2, and 3 (track 0, track 1, track 2, and track 3) in each band. A guard region (or a gap) is disposed between the bands to prevent the data from being overwritten, etc. In tracks 0 to 2 of each band, therefore, one of sides of the track to be written is overwritten and the data signal width becomes narrow. In contrast, track 3 of each band holds a wider data signal width than that in tracks 0 to 2 since the track is not overwritten.

Since the interval between adjacent tracks can be designed to be narrow, in the shingled write recording capable of sequential overwriting, the data tracks on the disk 1 can be formed at high density.

As shown in FIG. 1, the MPU 60 includes a write count manager 62, an estimated time calculator 64 and a data refresh manager 66. The MPU 60 controls each of the portions by referring to the system information 101. Processing of the write count manager 62, the estimated time calculator 64 and the data refresh manager 66 are implemented in firmware.

First, the system information 101 of the present embodiment will be explained with reference to the accompanying drawings.

FIG. 3 is a table showing an example of the system information of the present embodiment.

In the present embodiment, the system information 101 includes an estimated time table G1, a data refresh initial start time Td0, a data refresh start time Td, a data refresh time m, and a current time Tn.

The estimated time table G1 is a table including a threshold value (data refresh threshold value) K of a write count to be explained later, write counts (k', k) indicating counts (counts of executing the write processing) at which the data is written to the bands adjacent to both sides of the band of target, write times (t', t) indicating times at which the write is executed on the adjacent bands on both sides, an estimated time T, etc. t is a write time of the write executed immediately before the current point of time (current time Tn to be explained later), for example, before one write count, k is the write count at the time t, t' is a write time of the write executed before one previous write executed at the time t, and k' is a write count at the time t'. In addition, the estimated time is a time at which the data refresh should be started. The estimated time is estimated and updated, based on the threshold value K, the write counts (k', k) and the write times (t', t). The threshold value K of the write count is a value of write count which the data refresh needs to be executed for the band of target. The threshold value K may be the same value for all of the bands or may be set at different values for respective bands.

The data refresh initial start time (hereinafter called the initial start time) Td0 is an initial value of the time at which the data refresh is scheduled to be started. The initial start time Td0 is represented by as an accumulated time from the time at which the magnetic disk drive 200 is first activated after shipment by the user (hereinafter called a cumulative time from the first activation time). The initial start time Td0 is preset at the manufacturing step, etc. The initial start time Td0 is the same value for the storage region, for example, all the bands, and is set at a numerical value which is significantly great for the lifetime of the magnetic disk drive 200.

The data refresh start time (hereinafter called the start time) Td is the time at which the data refresh to be executed latest from the current point of time (current time Tn to be explained later) is scheduled to be started. The start time Td is represented by the cumulative time from the first activation time. The start time Td is estimated from the estimated time T of the estimated time table G1 at the current point of time (current time Tn to be explained later). The start time Td is therefore updated every time the estimated time T is updated. If the estimated time T is not calculated, the time is set as the start time Td=Td0. For example, the estimated time T is not calculated immediately after the initial activation, immediately after execution of the data refresh, etc.

The data refresh time m is the time (required time) from the start of the data refresh for the single band until completion of the data refresh. In the embodiments, the data refresh time m is the same for all the bands. The data refresh time m may be set for each band.

The current time Tn is the cumulative time from the first activation time. For convenience of explanations, the time unit is a second. It should be noted that the time unit may be hour, minute, etc., or an arbitrary value set in the magnetic disk drive 200.

Next, the write count manager 62, the estimated time calculator 64 and the data refresh manager 66, of the MPU 60, will be explained with reference to FIG. 1.

The write count manager 62 manages the write count on the disk 1. In the present embodiment, the write count manager 62 manages counts the write count in any one of the bands adjacent to both sides of the band of target, and updates the write count of the system information 101 every time the adjacent band is written. For example, if the data is written in band 1 in the estimated time table G1 shown in FIG. 3, the write count manager 62 increases (increments) the write counts k of bands 0 and 2, and updates the write times of bands 0 and 2 to the current time Tn at the time of writing the data in Band 1. At this time, the write count manager 62 sets the write counts k of bands 0 and 2 to be updated to the previous write counts k', and sets the write times t of bands 0 and 2 to be updated to the previous write times t'. If the write count k reaches the threshold value K and the data refresh is executed, the write count manager 62 updates the write count k of the system information 101 (estimated time table G1) to a value smaller than the current value, for example, 0. However, the write time t of the estimated time table G1 is maintained.

The estimated time calculator 64 calculates the estimate time T of the band of target. The estimated time calculator 64 writes the calculation result in the system information 101 (estimated time table G1). The estimated time calculator 64 calculates the estimated time by referring to an approximate straight line derived from both an increase rate of the write count and a time interval of the write time. An equation for calculating the estimated time may be preset in the manufacturing process as a program or may be arbitrarily set by the user. For example, the estimated time calculator 64 sets the estimated time T of the estimated time table G1 at the initial start time Td0, immediately after executing the data refresh.

Figure 4:
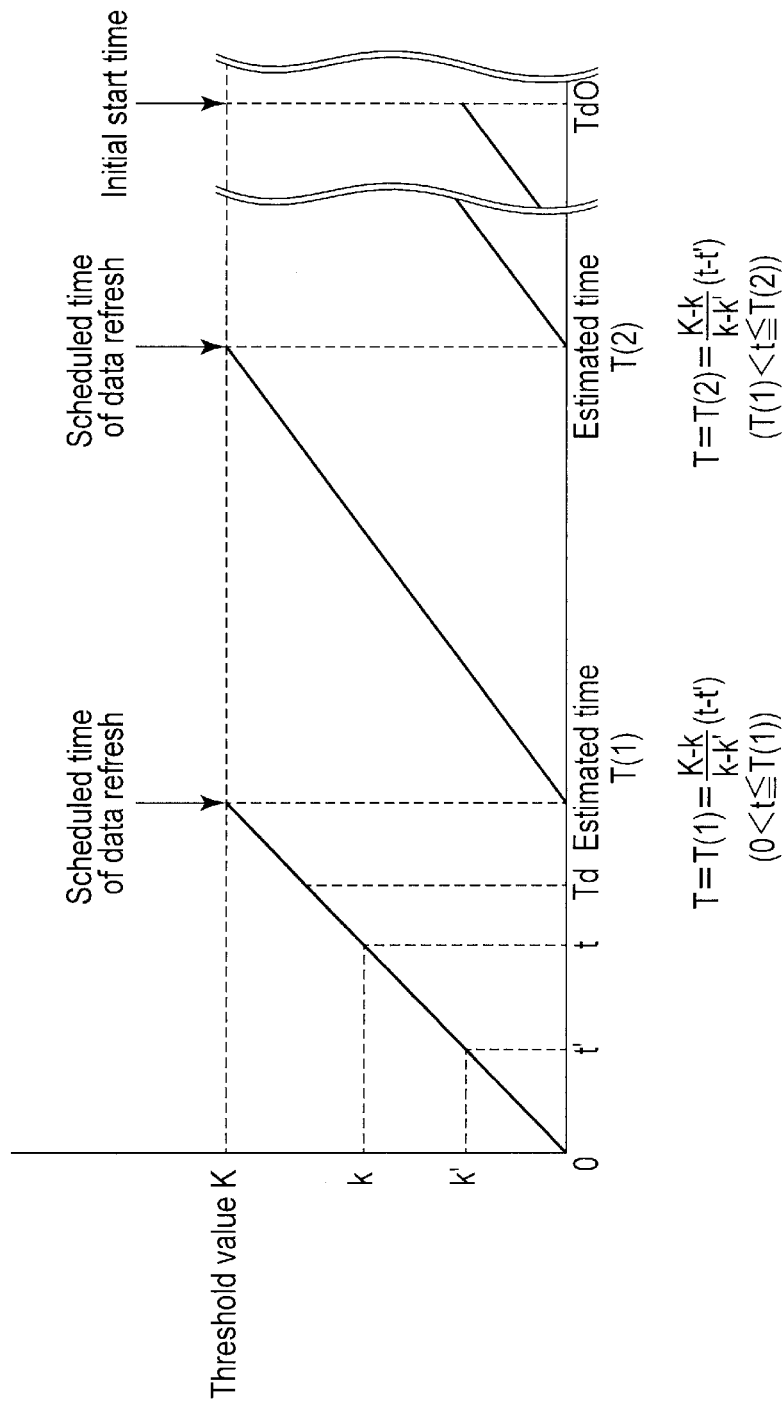
FIG. 4 is an illustration for explanation of a concept of an estimated time of the first embodiment.

FIG. 4 is a graph for explanation of a concept of the estimated time, of the present embodiment.

FIG. 4 shows a concept of the estimated time in a case where the data refresh is repeatedly executed for the same band. In FIG. 4, an estimated time T(1) is the estimated time T at which a first data refresh is scheduled to be executed, and an estimated time T(2) is the estimated time T at which a second data refresh is scheduled to be executed after estimated time T(1). The initial start time Td0 is assumed to be set at a time significantly remote from the initial activation time (t=0) in FIG. 4. In FIG. 4, a reference symbol Td indicates the above-explained start time.

An example of a method of deriving the estimated time T will be hereinafter explained with reference to a range (0<t≤T(1)) from the initial activation time to Ti shown in FIG. 4.

The estimated time calculator 64 calculates the estimated time T by referring to the following equation derived from both increase rates of the write counts (k, k') and time intervals of the write times (t, t'), as shown in FIG. 4.

$$T=t+(K-k)/(k-k')\times(t-t') \qquad (1)$$

If the estimated time T is assumed to be calculated every time the data is written to the adjacent band, the estimated time calculator 64 can calculate the estimated time T by the following equation since k-k'=1.

$$T=t+(K-k)\times(t-t') \qquad (2)$$

In the present embodiment, the estimated time calculator 64 calculates the estimated time T by the Equation (2) in accordance with updating of the write counts (k, k') and the write times (t, t') of the estimated time table G1, and updates the estimated time T of the estimated time table G1. At the initial activation time (t=0) and the data refresh execution times (T(1) and T(2)), the estimated time calculator 64 does not calculate the estimated time T by the Equation (2), but sets the initial start time Td0 as the estimated time T.

After the first data refresh is executed at estimated time T(1), the estimated time calculator 64 calculates estimated time T(2) of the second data refresh, in FIG. 4. At this time, the estimated time calculator 64 derives estimated time T(2) by Equation (2) similarly to the first data refresh, during a period from estimated time T(1) to the estimated time T(2). The period from the initial activation time to estimated time T(1) is not necessarily the same as the period after execution of the first data refresh (estimated time T(1)) to estimated time T(2).

In addition, the write count k is increased (linearly) at regular time intervals from the initial activation time until estimated time T(1), in FIG. 4, for convenience of explanations, but the increase rate of the write count k can be varied until estimated time T(1). In other words, inclination of the write count k can be varied at each time t, in FIG. 4. In this case, for example, a relationship between the threshold value K and the time (for example, the write time t) during the period from the initial activation time to estimated time T(1) in FIG. 4 is represented by not a straight line, but a polygonal line.

In addition, the estimated time calculator 64 may be constituted to execute processing of extending the calculated estimated time T, by determining that an accuracy of the estimated time T is low when the write count is small. When the write count is small, an error may occur between the time in which the write count actually reaches the threshold value and the estimated time T. The error can be therefore reduced by the estimated time calculator 64 determining that the accuracy of the estimated time T is low.

The data refresh manager 66 manages the data refresh on the disk 1. The data refresh manager 66 periodically searches for a region necessary for the data refresh, in the recording region on the disk 1 by referring to the system information 101 and executes the data refresh for the storage region when the recording region where the data refresh needs to be executed is detected.

The data refresh manager 66 executes the data refresh for the particular band when the data refresh manager 66 detects a case where the write count of the particular band reaches the data refresh threshold value, a case where the current time Tn reaches the data refresh start time Td of the particular band, or a case where the current time Tn reaches the estimated time T of the particular band. The data refresh manager 66 resets the data refresh start time Td and sets the time to the initial start time Td0, immediately after executing the data refresh.

In addition, when the data refresh manager 66 detects a plurality of bands having the estimated times T close to each other, the data refresh manager 66 sets the order of executing the operations of data refresh, based on the estimated times T of the bands, and sequentially executes the data refresh in the set order. In this case, the data refresh manager 66 starts the data refresh for a plurality of bands (band group) having the estimated times T close to each other, before the estimated times T, and executes the data refresh at equal time intervals.

An example of the data refresh processing for the plurality of bands having the estimated times close to each other will be hereinafter explained with reference to the figures.

When the data refresh manager 66 detects a plurality of bands having the estimated times T close to each other, the data refresh manager 66 determines whether the time interval of each estimated time T is smaller than the data refresh time m. If the time interval of each estimated time T is smaller than the data refresh time m, the data refresh manager 66 determines that "the estimated times are approximate" in relation to a plurality of estimated times T shorter than the data refresh time m. In addition, if the time interval of each estimated time T is not smaller than the data refresh time m, the data refresh manager 66 determines a plurality of estimated times T not shorter than the data refresh time m as remote estimated times.

For example, the data refresh time m included in the system information 101 shown in FIG. 3 is assumed to be two seconds. In addition, the current time Tn is assumed to be close to the estimated time (7208 (seconds)) of band 2. If the data refresh is executed for band 2, the data refresh manager 66 determines that the estimated times T (7210 (seconds)) of bands 1 and 4 are close when a difference from the estimated time T (7208 (seconds)) of band 2 falls within two seconds of the data refresh time m. Furthermore, the data refresh manager 66 determines that the estimated time T (7211 (seconds)) of band 0 is close when a difference from the estimated times T (7210 (seconds)) of bands 1 and 4 fall within the data refresh time m (two seconds). The data refresh manager 66 detects the band in which the estimated time T is close until the band in which the estimated time T falls within the data refresh time m is not detected.

If the data refresh manager 66 ends detection of the bands in which the estimated time T is close, the data refresh manager 66 sets the order of executing the operations of data refresh. At this time, the data refresh manager 66 sets the data refresh to be executed with higher priority for the bands having earlier estimated times T.

For example, the data refresh manager 66 sets the data refresh to be executed with higher priority for band 2 having the earliest estimated time T, of the band group (band 0, band 1, band 2 and band 4) determined to have close estimated times T, with reference to the estimated time table G1 shown in FIG. 3. If the estimated times T are the same, the data refresh manager 66 sets the data refresh to be executed with higher priority for the bands having greater previous write counts. In FIG. 3, the estimated times of bands 1 and 4 are the same as each other, and the previous write count k of band 1 is greater than the previous write count k of band 4. In this case, the data refresh manager 66 sets the data refresh to be executed with higher priority for band 1 than for band 4. Then, the data refresh manager 66 sets the data refresh to be last executed for band 0 having the latest estimated time, of the band group having the close estimated times.

After setting the order of executing the data refresh, the data refresh manager 66 sets the timing of execution and the time intervals, of the data refresh. The data refresh manager 66 calculates the time necessary to execute all the operations of data refresh for the band group having the close estimated times, based on the current time T, number n of a plurality of bands, and the data refresh time m.

The data refresh manager 66 calculates a total time (m×(n−1)) necessary for the data refresh for the bands other than the band of the last executed data refresh, of the band group having substantially the same estimated times, and also calculates a time difference (Te−Tn) between the current time Tn and the estimated time Te of the data refresh which is last executed (last estimated time).

The data refresh manager 66 compares the calculated total time (m×(n−1)) with the time difference (Te−Tn), and executes the data refresh until the time Tn having a greater time difference (Te−Tn) than the total time (m×(n−1)).

Several examples of the timing of execution of the data refresh will be hereinafter explained.

Figure 5A:
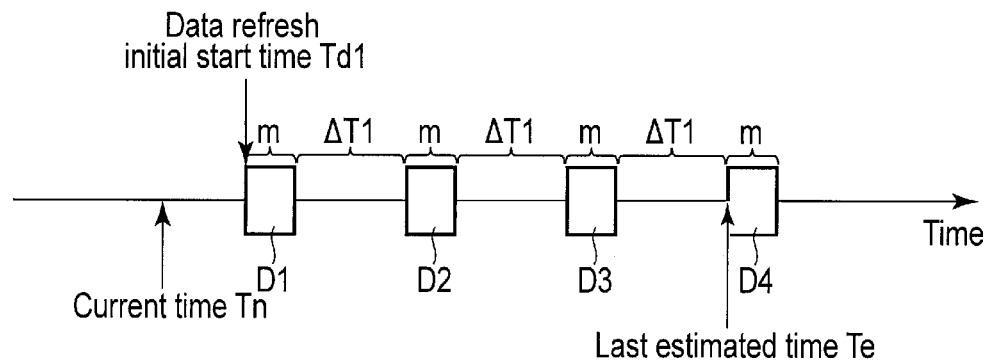
FIG. 5A is an illustration showing an example of a timing chart of data refresh.
Figure 5B:
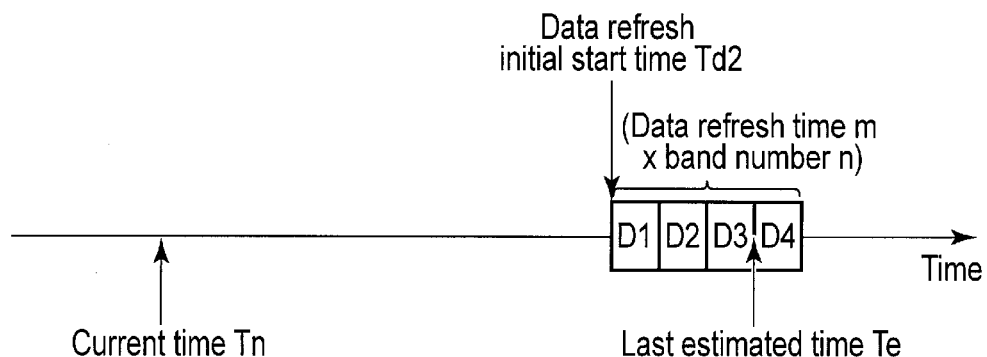
FIG. 5B is an illustration showing another example of the timing chart of the data refresh.

FIG. 5A and FIG. 5B show examples of timing charts of the data refresh. In FIG. 5A and FIG. 5B, each of D1, D2, D3, and D4 indicates the data refresh. For example, D1 indicates the data refresh of band 2, D2 indicates the data refresh of band 1, D3 indicates the data refresh of band 4, and D4 indicates the data refresh of band 0. In addition, in FIG. 5A and FIG. 5B, each of reference symbols Td1 and Td2 indicates the time at which the data refresh to be executed latest is scheduled to be started at the current point of time. In other words, each of reference symbols Td1 and Td2 indicates the start time of the data refresh which is first executed when a plurality of bands have close estimated times. In FIG. 5A, each ΔT1 represents a time interval between the operations of data refresh in each band.

In the example shown in FIG. 5A, the data refresh manager 66 executes setting particular time interval ΔT1 between the operations of data refresh in each band. The time interval ΔT1 is included in the system information 101. In addition, the time interval ΔT1 may be preset or may be arbitrarily set from the outside of the magnetic disk drive 200. The data refresh manager 66 calculates the data refresh start time by the following equation, with reference to the system information 101.

$$Td1=(Te-(n-1)\times(m+\Delta T1)) \quad (3)$$

The data refresh manager 66 executes the data refresh in the order of steps set when the current time Tn reaches the data refresh start time Td1. In other words, the time interval ΔT1 is set between the operations of data refresh.

If four operations of the data refresh are executed as shown in FIG. 5A, the data refresh start time Td1 is represented by Td1=(Te−3(m+ΔT1)). In this case, the data refresh manager 66 starts data refresh D1 at the data refresh start time Td1 and, after ending the data refresh D1 and spending the time interval ΔT1, executes next data refresh D2. Similarly, the data refresh manager 66 executes data refresh D3 after ending the data refresh D2 and spending the time interval ΔT1, and finally executes data refresh D4 after ending the data refresh D3 and spending the time interval ΔT1. The data refresh manager 66 can thus execute the operations of data refresh, equally in time.

In the example shown in FIG. 5B, the data refresh manager 66 calculates the data refresh start time Td2 by the following equation by referring to the system information 101.

$$Td2=(Te-(n-1)\times m) \quad (4)$$

The data refresh manager 66 executes the data refresh in the order which is set when the current time Tn reaches the data refresh start time Td1. In FIG. 5B, the data refresh manager 66 starts the data refresh D1 and then sequentially executes data refresh D2 and the data refresh D3 when the current time Tn reaches the data refresh start time Td2. Finally, the data refresh manager 66 starts the data refresh D4 at the last estimated time Te which is the estimated time. The data refresh manager 66 can thus execute the operations of data refresh, equally in time.

When a plurality of bands having close estimated times are detected, the data refresh manager 66 can execute the data refresh at the timing of several examples explained above, in accordance with situations, after setting the order of steps of executing the data refresh. The case in which the data refresh to be last executed starts at the last estimated time Te has been explained, but the data refresh manager 66 may be constituted to execute the data refresh for all the bands having close estimated times before the last estimated time Te. In FIG. 5A and FIG. 5B, for example, the data refresh manager 66 may execute data refresh D1 to D4 such that all the operations are ended before the last estimated time Te.

Figure 6:
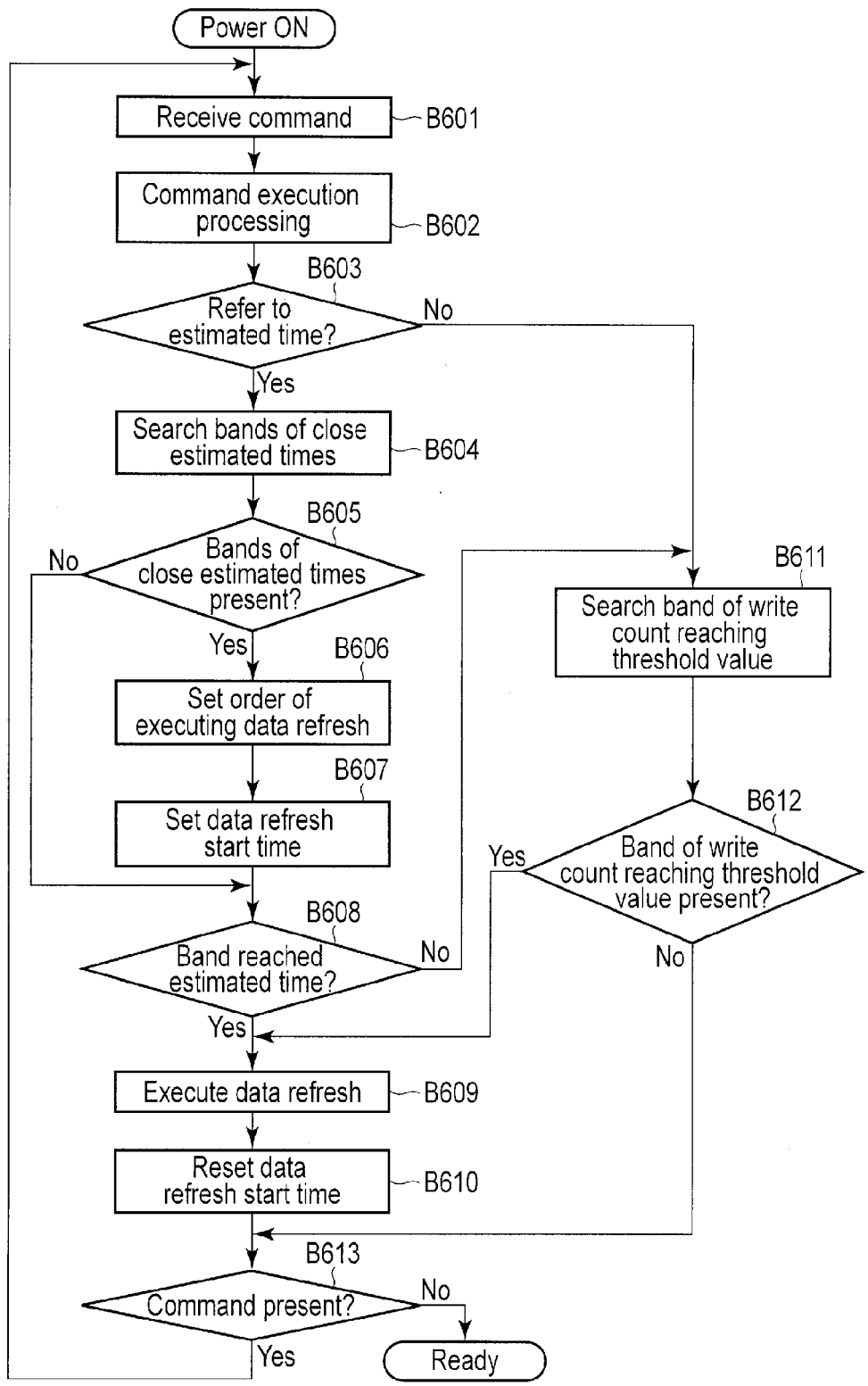
FIG. 6 is a flowchart showing an example of processing of the magnetic disk drive of the first embodiment.

FIG. 6 is a flowchart showing an example of the data refresh processing of the magnetic disk drive 200 of the present embodiment.

The magnetic disk drive 200 is activated, receives a write command from the host system 150, in B601, and the flow proceeds to processing in B602. The magnetic disk drive 200 executes the write command received from the host system 150, and the write count manager 62 updates the estimated time table G1, in B602, and the flow proceeds to processing in B603.

In B603, the MPU 60 determines whether to refer to the estimated time T of the estimated time table G1. If the MPU 60 refers to the estimated time T (Yes in B603), the MPU 60 (data refresh manager 66) searches for the bands having the close estimated times in B604, and the flow proceeds to processing in B605.

In contrast, if the MPU 60 does not refer to the estimated time T (No in B603), the flow proceeds to processing in B611.

In B605, the data refresh manager 66 determines whether the bands having close estimated times are present. If the data refresh manager 66 determines that a plurality of bands having close estimated times are present (Yes in B605), the data refresh manager 66 sets the order of steps of executing the data refresh in B606, and the flow proceeds to processing in B607.

The data refresh manager 66 sets the start time Td so as to execute the data refresh in the order which is set in B606, in B607, and the flow proceeds to processing in B608. At this time, the data refresh manager 66 sets the start time Td so as to execute a plurality of operations of data refresh, equally in time.

In contrast, if the data refresh manager 66 determines that the bands having close estimated times are not present (No in B605), the flow proceeds to processing in B608.

In B608, the data refresh manager 66 determines whether the bands reaching the estimated time are present. If the data refresh manager 66 determines that a band reaching the estimated time is present (Yes in B608), the data refresh manager 66 executes the data refresh for the band reaching the estimated time, in B609, and the flow proceeds to processing in B610. At this time, if the settings are executed in B606 and B607, the data refresh manager 66 sequentially executes the operations of data refresh for the plurality of bands having close estimated times in accordance with the settings.

In contrast, if the data refresh manager 66 determines that a band reaching the estimated time is not present (No in B608), the flow proceeds to processing in B611.

The data refresh manager 66 resets the start time Td of the data refresh and ends the inner execution processing, in B610, and the flow proceeds to processing in B613.

In B611, the data refresh manager 66 searches for a band having the write count reaching the threshold value. In B612, the data refresh manager 66 determines whether a band having the write count reaching the threshold value is present. If the data refresh manager 66 determines that a band having the write count reaching the threshold value is present (Yes in B612), the flow proceeds to processing in B609. If the data refresh manager 66 determines that a band having the write count reaching the threshold value is not present (No in B612), the flow proceeds to processing in B613.

In B613, the MPU 60 determines whether the command is transmitted from the host system 150. If the MPU 60 determines that the command is transmitted from the host system 150 (Yes in B613), the flow returns to processing in B601. If the MPU 60 determines that the command is not transmitted from the host system 150 (No in B613), the disk drive becomes in a standby state.

The magnetic disk drive 200 of the present embodiment calculates the estimated time concerning the execution of data refresh, at the time of receiving the write command from the host system 150, and determines whether timings of executing the data refresh in the plurality of bands overlap or not. The magnetic disk drive 200 controls the timings of executing the data refresh in the plurality of bands by the MPU 60 (data refresh manager 66) such that the timings do not overlap. Furthermore, the magnetic disk drive 200 can also execute a plurality of operations of data refresh, separately in time. The magnetic disk drive 200 of the embodiments can therefore prevent the operations of data refresh from being executed in the plurality of bands at the same time. Consequently, the magnetic disk drive 200 of the present embodiment can process the command of the host system 150 with a stable response performance.

Next, a modified example of the magnetic disk drive of the first embodiment will be explained. In the modified example, portions like or similar to those of the above-explained first embodiment are denoted by the same reference numbers or symbols and detailed descriptions are omitted.

Modified Example

The magnetic disk drive 200 of the modified example of the first embodiment has substantially the same configuration as the first embodiment, but each band is divided into an inner region and an outer region to manage the data refresh.

FIG. 7 is a table showing an example of the system information 101 of the modified example of the present embodiment.

The system information 101 of the modified example includes an estimated time table G2. In the estimated time table G2, the region of each band is divided into an inner region and an outer region:

The write count manager 62 counts the write count (first write count) in the inner region of each band shown in FIG. 7 if the data is written to a band more inward than the band of target on the disk 1, and counts the write count (second write count) in the outer region of each band shown in FIG. 7 if the data is written to a band more outward than the band of target on the disk 1.

The estimated time calculator 64 calculates the estimated time T and updates the estimated time T of the estimated time table G2 every time the write counts (k and k') and the write times (t and t') of the inner and outer regions in each band shown in FIG. 7 are updated.

If any one of the inner or outer region of a particular band shown in FIG. 7 meets a condition for executing the data refresh, the data refresh manager 66 executes the data refresh for the entire particular band. For example, the data refresh manager 66 calculates an estimated time (first estimate time) at which the first write count reaches the threshold value and an estimated time (second estimate time) at which the second write count reaches the threshold value, and executes the data refresh for the particular band if the current time Tn reaches any one of the first estimated time and the second estimated time.

The magnetic disk drive of the modified example can calculate the estimated times at higher accuracy than the magnetic disk drive of the first embodiment. The magnetic disk drive of the modified example can provide a more stable response performance than the magnetic disk drive of the first embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk drive comprising:
a disk comprising a plurality of track groups each comprising a first write track and a second write track partially overlapping the first write track; and
a processor configured to count a write count corresponding to write processing of adjacent track groups for each of the plurality of track groups, and calculate an estimated time at which the write count reaches a particular value and, if a track group in which the calculated estimated time is approximate is detected, read data of the track group in which the estimated time is approximate, and execute rewrite processing of writing the read data to the track group in which the estimated time is approximate, at a time earlier than the estimated time.

2. The magnetic disk drive of claim 1, wherein
if a plurality of approximate track groups are present, the processor executes the rewrite processing for each of the track groups at equal time intervals.

3. The magnetic disk drive of claim 1, wherein,
if a difference between estimated times of the plurality of approximate track groups falls within a range of a required time spent until completion of the rewrite processing for the track groups, the processor determines that the estimated times are approximate.

4. The magnetic disk drive of claim 1, wherein,
the processor counts the write count while each of the track groups is divided into an inner region and an outer region in a radial direction.

5. The magnetic disk drive of claim 4, wherein,
the processor counts a first count corresponding to write to a track group adjacent to the inner region and a second count corresponding to write to a track group adjacent to the outer region.

6. The magnetic disk drive of claim 5, wherein,
the processor calculates a first estimated time at which the first count reaches the particular value and a second estimated time at which the second count reaches the particular value, and executes the rewrite processing if a current time reaches any one of the first estimated time and the second estimated time.

7. A rewrite processing method of a magnetic disk drive comprising a disk which comprises a plurality of track groups each including a first write track and a second write track partially overlapping the first write track, the method comprising:
counting a write count corresponding to write processing of adjacent track groups for each of the plurality of track groups, and calculating an estimated time at which the write count reaches a particular value; and
if a track group in which the calculated estimated time is approximate is detected, reading data of the track group in which the estimated time is approximate, and executing rewrite processing of writing the read data to the track group in which the estimated time is approximate, at a time earlier than the estimated time.

8. The rewrite processing method of claim 7, further comprising:
if a plurality of approximate track groups are present, executing the rewrite processing for each of the track groups at equal time intervals.

9. The rewrite processing method of claim 7, further comprising:
if a difference between estimated times of the plurality of approximate track groups falls within a range of a required time spent until completion of the rewrite processing for the track groups, determining that the estimated times are approximate.

10. The rewrite processing method of claim 7, further comprising:
counting the write count while each of the track groups is divided into an inner region and an outer region in a radial direction.

11. The rewrite processing method of claim 10, further comprising:

counting a first count corresponding to write to a track group adjacent to the inner region and a second count corresponding to write to a track group adjacent to the outer region.

12. The rewrite processing method of claim 11, further comprising:
    calculating a first estimated time at which the first count reaches the particular value and a second estimated time at which the second count reaches the particular value; and
    executing the rewrite processing if a current time reaches any one of the first estimated time and the second estimated time.

13. A magnetic disk drive comprising:
    a disk comprising a first track group including a first write track and a second write track partially overlapping the first write track, and a second track group adjacent to the first track group; and
    a processor configured to estimate an estimated time at which rewrite processing of reading data of the first track group and writing the read data to the first track group, based on a write count at which write to the second track group is executed and a time at which the write to the second track group is executed, and execute the rewrite processing on the first track group, based on the estimated time.

14. The magnetic disk drive of claim 13, wherein,
    the processor counts the write count while the first track groups is divided into an inner region and an outer region in a radial direction.

15. The magnetic disk drive of claim 14, wherein,
    the processor counts a first count corresponding to write to a second track group adjacent to the inner region and a second count corresponding to write to a second track group adjacent to the outer region.

16. The magnetic disk drive of claim 15, wherein,
    the processor calculates a first estimated time at which the first count reaches a particular value and a second estimated time at which the second count reaches the particular value, and executes the rewrite processing if a current time reaches any one of the first estimated time and the second estimated time.

* * * * *